(12) United States Patent
Visser et al.

(10) Patent No.: US 8,493,714 B2
(45) Date of Patent: Jul. 23, 2013

(54) ELECTRONIC DEVICE WITH A CLEANING UNIT FOR A FLEXIBLE DISPLAY

(75) Inventors: Hendrik Dirk Visser, Waalre (NL); Johannes Cornelis Adriaan Hamers, Breugel (NL); Gijs Peters, Eindhoven (NL); Hjalmar Edzer Ayco Huitema, Veldhoven (NL)

(73) Assignee: Creator Technology B.V., Breda (NL)

( * ) Notice: Subject to any disclaimer, the term of this patent is extended or adjusted under 35 U.S.C. 154(b) by 238 days.

(21) Appl. No.: 12/599,466

(22) PCT Filed: May 9, 2008

(86) PCT No.: PCT/NL2008/050280
§ 371 (c)(1),
(2), (4) Date: Feb. 23, 2010

(87) PCT Pub. No.: WO2008/140308
PCT Pub. Date: Nov. 20, 2008

(65) Prior Publication Data
US 2010/0182738 A1     Jul. 22, 2010

Related U.S. Application Data

(60) Provisional application No. 60/916,997, filed on May 9, 2007.

(51) Int. Cl.
*H05K 5/00*       (2006.01)
*H05K 7/00*       (2006.01)
*H04M 1/00*       (2006.01)

(52) U.S. Cl.
USPC ............ 361/679.01; 361/679.05; 361/679.06; 361/679.27; 455/575.3

(58) Field of Classification Search
USPC ............ 361/679.01, 679.02, 679.08, 679.09, 361/679.3, 679.55–679.59; 345/156, 157, 345/168, 169; 455/325, 556.1, 550.1, 90.1, 455/575.1
See application file for complete search history.

(56) References Cited

U.S. PATENT DOCUMENTS 1,857,633 A     5/1932   Gramsa
3,642,536 A *  2/1972   Robak ............................. 134/6

(Continued)

FOREIGN PATENT DOCUMENTS

CN     1491797          4/2004
DE     19934368 A1      1/2001

(Continued)

OTHER PUBLICATIONS

International Search Report for PCT/NL2008/050280 dated Aug. 21, 2008.

(Continued)

*Primary Examiner* — Zachary M Pape
*Assistant Examiner* — Jerry Wu (57) ABSTRACT

An electronic device is disclosed comprising a housing (1) and a retractable display (3) conceived to be alternated between an at least partially extended state and a retracted state, the device comprising a cleaning unit (6) integrated in the housing and being arranged for removing contamination from at least a front surface of the display. The flexible display (3) can be retracted by sliding the side members (4a, 4b, 4c, 5a, 5b, 5c) into the housing using, for example, a grip (7). Preferably, in the electronic device 10 the display is provided with edge members 8a, 8b for guiding the bar (6).

9 Claims, 8 Drawing Sheets

U.S. PATENT DOCUMENTS

| | | |
|---|---|---|
| 5,204,666 A | 4/1993 | Aoki et al. |
| 5,671,029 A * | 9/1997 | Haruki ............................. 349/96 |
| 5,953,052 A | 9/1999 | McNelley et al. |
| 2006/0082518 A1 | 4/2006 | Ram |
| 2007/0195057 A1* | 8/2007 | Aylward et al. ................ 345/107 |
| 2008/0198540 A1* | 8/2008 | Bemelmans et al. ......... 361/681 |
| 2009/0208654 A1* | 8/2009 | MacFarlane .................. 427/299 |

FOREIGN PATENT DOCUMENTS

| | | |
|---|---|---|
| JP | 6-87096 | 12/1994 |
| JP | 8129431 A | 5/1996 |
| JP | 10042098 A * | 2/1998 |
| JP | 2000-19980 | 1/2000 |
| JP | 2000254605 A | 9/2000 |
| JP | 2001334844 A | 12/2001 |
| JP | 2004-312143 | 11/2004 |
| JP | 2005081348 A | 3/2005 |
| JP | 2007-009326 | 1/2007 |
| WO | WO 2005/015302 A | 2/2005 |
| WO | WO 2006/085271 A | 8/2006 |

OTHER PUBLICATIONS

Japan Patent Office, Office Action, Patent Application Serial No. 2010-507345, Oct. 30, 2012, Japan.
European Patent, Search Report, Patent Application Serial No. 12197974.4-1231, Jan. 31, 2013, Netherlands.
European Patent, Search Report, Patent Application Serial No. 12197991.8-1231, Feb. 1, 2013, Netherlands.
China Patent Office, Office Action, Patent Application Serial No. 200880023944.3, Feb. 4, 2013, China.
European Patent, Search Report, Patent Application Serial No. 12197966.0-1231, Jan. 30, 2013, Netherlands.
European Patent, Search Report, Patent Application Serial No. 12197984.3-1231, Feb. 1, 2013, Netherlands.

* cited by examiner

ELECTRONIC DEVICE WITH A CLEANING UNIT FOR A FLEXIBLE DISPLAY

FIELD OF THE INVENTION

The invention relates to an electronic device comprising a housing and a retractable display conceived to be alternated between an at least partially extended state and a retracted state.

BACKGROUND OF THE INVENTION

Devices that use flexible, notably rollable or wrappable displays can have an open state in which the display is at least partially readable and a closed state in which the display is stored away. Due to the fact that the flexible display comprises a fragile layer, any contamination of its surface may cause damage. Such contamination may comprise particles of any origin and/or liquids.

It is a disadvantage of the known electronic devices provided with the flexible display in that foreign particles may contaminate a front or a back surface of the display causing damage thereof when the display is retracted or extended.

SUMMARY OF THE INVENTION

It is an object of the invention to provide an electronic device with a retractable display wherein damage of a display surface caused by a foreign matter present on the display surface is counteracted.

To this end the electronic device according to the invention comprises a cleaning unit integrated in the device and being arranged for removing contamination from at least a front surface of the display. Preferably, the cleaning unit is arranged for removing the contamination by contacting at least the front surface of the display. Due to this feature, not only loose particles can be eliminated from the surface of the display, but also liquids. The cleaning unit may be suitably integrated in the housing of the device, notably inside the housing.

The technical measure of the invention is based on the insight that by effectively removing foreign matter, like particles and/or liquids from at least the front surface of the display the durability of the display is improved. It is acknowledged that suitable cleaning means are known per se in the field of cleaning rigid optical surfaces such as monitor screens, camera lenses or screens for mobile telephones. The cleaning is usually implemented manually by using suitable applicators, which may be provided with or without cleaning fluids. In the field of photo-copiers and electronic portable devices methods are known for preventing dust from entering into certain areas. However, no cleaning means are known for the electronic devices provided with a flexible display.

In an embodiment of the electronic device the cleaning unit comprises a displaceable bar arranged for removing the contamination by sliding at least along the front surface of the display.

This feature provides a simple and reliable means for mechanical removal of the particles from the front surface of the display. Preferably, the display is provided with edge members, the bar being guided by the edge members. More preferably, the bar is shaped for receiving the display. Preferably, the bar is manufactured from a substantially rigid material, like plastic, coated metal or the like. In order to reduce friction between the bar and the surface of the flexible display, the bar surface facing the display may be provided with a suitable material, notably a cloth. Soft felt is an example of suitable material. In an alternative embodiment the bar comprises a brush, notably a hairy brush for removing foreign matter, notably the particles from the surface of the display. It will be appreciated by those skilled in the art that the displaceable bar as is set forth in the foregoing may be integrated in the housing of the electronic device comprising either a rollable or a wrappable display.

Preferably, if the retractable display is arranged to be extended from the housing via a port, the cleaning unit is arranged near the port. Due to this technical measure penetration of the particles into the housing of the electronic device is prevented on one hand, and the contamination is removed from the display in an effective way, on the other hand.

For a rollable display conceived to be stored while being wound about a roller, situated notably inside a suitable housing of the device, it is found to be advantageous to make use of the fact that the flexible display is passing through the port when being retracted or extended. Moreover, it is appreciated that the port provides additional support to the surface of the display in a direct vicinity of the port. By placing the cleaning unit near the port, a synergetic effect occurs between the supportive action of the port and the cleaning unit exhibiting, in use, a pressure on the surface of the display. This synergetic effect ensures that no indentation occurs on the surface of the display due to cleaning.

In a further embodiment of the electronic device according to the invention, a surface of the cleaning unit conceived to contact at least the front surface of the display comprises a cloth.

Preferably, the cloth comprises a felt, notably a soft felt. In a preferred embodiment the felt or the like is supported by an elastic material, preferably exhibiting light pressure to the front surface and, more preferably, also to the back surface of the display. When the display is rolled inside the device the felt prevents particles and/or liquids from entering the device. Preferably, the cloth is arranged on a first material arranged above the display and being further arranged to interact by an attractive force with a second material arranged below the display. Suitable examples of such first material and second material comprise two suitably oriented magnets or two items connected by an elastic connector or means. More preferably, the second material is arranged with a further cloth. Due to this feature the external pressure applied by the cleaning unit to the display area is counteracted by the second portion of the cleaning unit located below the display screen thereby protecting the display screen from undesired effects caused by sagging. Suitable examples of the first material and the second material comprise two magnets, or two units interconnected by an elastic means or connector.

In a further embodiment of the electronic device according to the invention, a surface of the cleaning unit conceived to contact at least the front surface of the display comprises a brush.

The brush is advantageous because the brush hairs are usually made of a soft material which is easily bendable upon exhibiting pressure to an external body, like the display screen. Therefore, no damage due to sagging can be caused for the display because the brush hairs constitute a soft structure which can be deformed easily upon encountering an obstacle. This may particularly be important when the surface contamination comprises particles with increased dimension, for example in the order of 1 $mm^3$. Preferably, the cleaning device, notably the brush or the like, is rotatable around an axis, said axis being substantially parallel to a plane in which the display is extended in an area near the cleaning unit. In a particular embodiment of the electronic device according to the invention wherein the retractable display is arranged to be wound about a roller positioned inside the housing, the cleaning unit, notably the brush or the like, is arranged to be drivable by the roller. It is noted that a similar effect can be reached when instead of a brush a cloth or the like is arranged on a suitable roller.

This feature has an additional advantage in that the angular speed of the brush can be matched to the angular speed of the roller. For example, by coupling the axis of the brush to the axis of the roller, notably using an intermediate gear, the rotating brush will remove particles with increased efficiency. It will be appreciated that the direction of rotation of the brush may coincide with the direction of rotation of the roller, or, alternatively, may be opposite the direction of rotation of the roller. It is also possible that the brush is rotatable transverse to a direction of propagation of the rollable display.

In a further embodiment of the electronic device according to the invention, the cleaning unit comprises a protruding member conceived to be arranged at least in a close proximity to at least the front surface of the display. Alternatively, the protruding member is arranged to contact at least the front surface of the display.

Preferably, a miniature knife or the like is used. More preferably, the protruding member is arranged obliquely with respect to a plane in which the display extends in an area near the cleaning unit. Due to the oblique arrangement of the protruded member, the surface of the display is effectively handled without introducing indentation damage to the display surface. Preferably the cleaning unit as set forth anywhere in the foregoing is arranged to be alternated between a first position of contacting the surface of the display and a second position distant from the surface of the display. Due to this feature the display is cleaned on demand, increasing durability of the display because external mechanical force is not continuously applied to the display.

In a further embodiment of the electronic device according to the invention, the cleaning unit comprises a vibrator for causing the display to vibrate thereby removing the contamination from the display. Preferably, the vibrator comprises a generator of acoustic or ultrasonic waves. In an alternative embodiment, the vibrator may comprise mechanical means for shaking the display surface, for example by displacing the roller with respect to the port. This feature provides simple and effective means for removing particle contamination of the display surface. The vibrator may be mounted inside or outside the port of the electronic device comprising a rollable display. In cases where the display is conceived to be wound around the housing of the electronic device, the vibrator is arranged anywhere on the housing, provided the surface of the flexible display is shaken by action of the vibrator. Those skilled in the art will appreciate that the power of such vibrator may be selected in a wide range, depending on the architecture of the electronic device.

In a further embodiment of the electronic device according to the invention, the cleaning unit is arranged for producing a stream of air directed to at least the front surface of the display. Preferably, the cleaning unit comprises compressible containers for generating the stream of air. It is noted that such cleaning unit is arranged either inside a housing of the electronic device, or outside said housing. For an embodiment of the electronic device comprising the flexible display conceived to be wound around the housing, the cleaning unit is arranged on the housing.

In a further embodiment of the electronic device according to the invention, the display includes an antistatic coating.

It is found to be particularly advantageous to coat at least the front surface of the flexible, notably retractable display with the antistatic coating because this substantially decreases an adherence force for contamination particles on the display screen thereby increasing the effectiveness of cleaning as is discussed in the foregoing.

In a further embodiment of the device according to the invention the cleaning unit is arranged to remove contamination by action of an attractive force. One possible example of such attractive force is implemented by a suitable roll which is arranged having a suitable electrostatic charge. The contamination present on the front surface of the display will be collected by the material of the roll thereby cleaning the display. Alternatively, the roll may be put into rolling action by the movement of the display. In this case the contamination particles collected by the material of the roll are preferably transported by the roll and can be deposited in a suitable container cooperating with the roll. It is also possible that the rolling action of the display causes the roll to accumulate additional electrostatic charge, or to compensate for the loss of the electrostatic charge due to cleaning.

In an alternative embodiment, the attractive force is produced by an adhesive medium arranged on the cleaning unit. For example a suitable sticky medium may be arranged on the surface of the cleaning unit collecting the contamination. It is noted that the cleaning unit may be arranged to be in contact with the surface of the display or may be arranged to operate in a contactless way. For the latter the spacing between the cleaning unit and the surface of the display may be kept as small as a dimension of the contamination particles.

These and other aspects of the invention will be described in more detail with reference to drawings.

DETAILED DESCRIPTION OF THE DRAWINGS

Figure 1A:
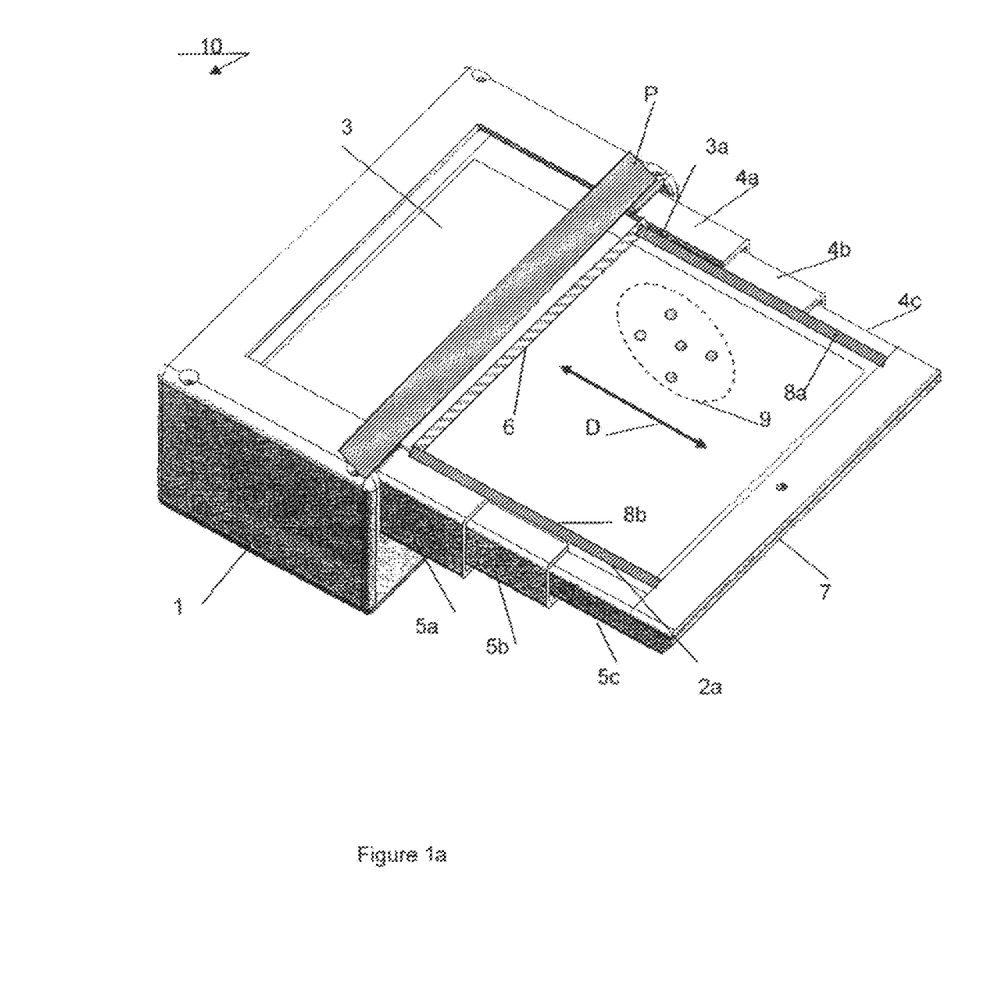
FIG. 1a schematically depicts an embodiment of the electronic device according to the invention.

FIG. 1a schematically depicts an embodiment of the electronic device according to the invention. The electronic device 10, notably a palmtop computer, a mobile telephone, an organizer, or the like comprises a housing 1 and a flexible display 3. The flexible display is arranged to be extended from the housing 1 by means of side members 4a, 4b, 4c, 5a, 5b, 5c. The side members preferably are telescopically arranged with respect to each other and are dimensioned to receive respective edge portions 2a, 3a of the display 3. The flexible display 3 may be manufactured using electrophoretic technology. Preferably, the flexible display is operable based on polymer electronics. It is noted that for clarity purposes the housing 1 is shown without an upper lid. The flexible display 3 can be retracted by sliding the side members 4a, 4b, 4c, 5a, 5b, 5c into the housing using, for example, a grip 7. By sliding the side members into the housing 1, the flexible display 3 enters the port P of the electronic device 10 and winds about a suitable roller (not shown) positioned inside the housing 1. In order to prevent the display 3 from being damaged by contamination present on the front surface of the display, the electronic device 10 comprises displaceable bar 6 arranged for removing the contamination 9 by sliding at least along the front surface of the display 3 in the direction D. Preferably, in the electronic device 10 the display is provided with edge members 8a, 8b for guiding the bar. The edge members 8a, 8b are preferably arranged for receiving the display without being attached to it. The bar 6 is displaced in a planar-parallel way with respect to the front surface of the display 3 due to its cooperation with the edge members 8a, 8b. It is noted that the bar may comprise a first member 6 and a second member (not shown) conceived for receiving the display there between, in fact the display 3 being sandwiched between the first member and the second member of the displaceable bar 6. Due to provision of the second member, indentation of the display 3 due to mechanical action of the first member 6 is counteracted.

Preferably, the bar is manufactured from a substantially rigid material, like plastic, coated metal or the like. In order to reduce friction between the bar and the surface of the flexible display, the bar surface facing the display may be provided with a suitable material, notably a cloth. Soft felt is an example of the suitable material. In an alternative embodiment the bar comprises a brush, notably a hairy brush for removing the foreign matter, notably the particles from the surface of the display.

Figure 1B:
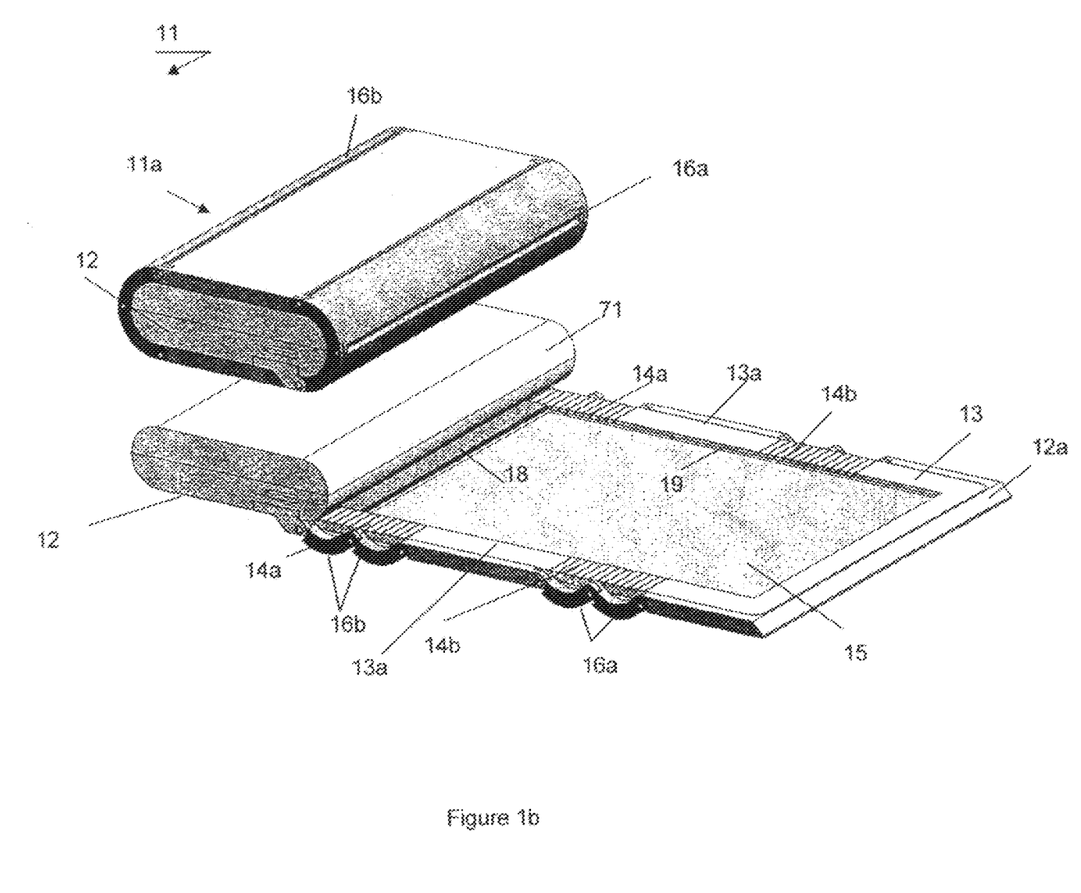
FIG. 1b schematically depicts a further embodiment of the electronic device according to the invention.

FIG. 1b schematically depicts a further embodiment of the electronic device according to the invention. The electronic device 11 comprises a housing 12 and a retractable, notably wrappable display 15 that is preferably arranged on a rigid cover 12a. The rigid cover 12a is arranged to be wound together with the display 15 around the housing 12 to a position 11a. The rigid cover 12a comprises the edge member 13 provided with rigid areas 13a and flexible areas 14a, 14b cooperating with hinges 16a, 16b of the cover 12a. When the display 15 is being retracted to the position wound about the housing 12, the surface of the display 15 may abut the housing 12. In order to prevent the display from being damaged by contamination present on its surface, the display 15 is provided with a cleaning unit comprising a displaceable bar 18. The bar 18 is arranged near the housing 12 in its dwell position and can be moved along the display area 15 to remove contamination. Preferably, the bar 18 cooperates with the side members 19 for guiding. The bar 18 may comprise materials as discussed with reference to FIG. 1a. Also in this embodiment side members 19 are arranged to guide the bar 18 along the surface of the display 15.

Figure 2:
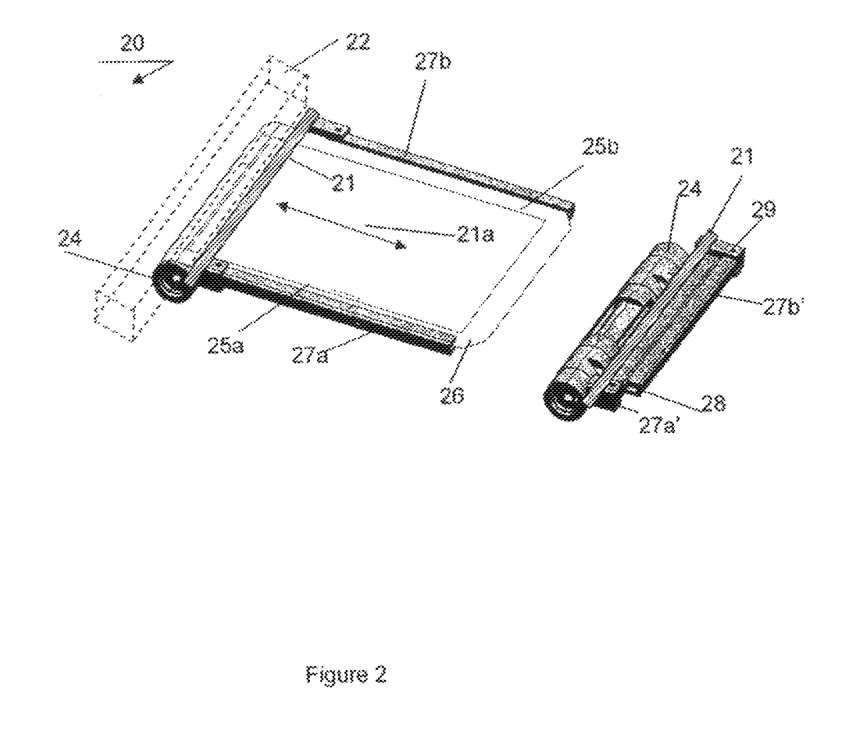
FIG. 2 schematically depicts a further embodiment of the electronic device according to the invention.

FIG. 2 schematically depicts a further embodiment of the electronic device according to the invention. The electronic device 20, notably a mobile phone, is arranged with a housing 22 wherein a roller 24 conceived to support the display in the retracted state is positioned. When the display 26 is extended from the housing 22 its edge portions 25a, 25b are preferably supported by suitable edge members 27a, 27b. The side members are alternated between an extended position 27a, 27b and a retracted position 27a', 27b' by means of a suitable hinge 29. In order to clean the flexible display 26 from a contamination present on its surface a displaceable bar 21 is provided. The bar 21 rests near the housing 22. When the display 26 is extended and before it is wound about the roller 24, the bar 21 may be moved along the surface of the display 26, for example in the direction 21a to mechanically remove contamination. It is noted that in order to prevent the display 26 from indentation, the side members 27a', 27b' are U-shaped for receiving the edge portion of the display thereby providing support to the display.

Figure 3:
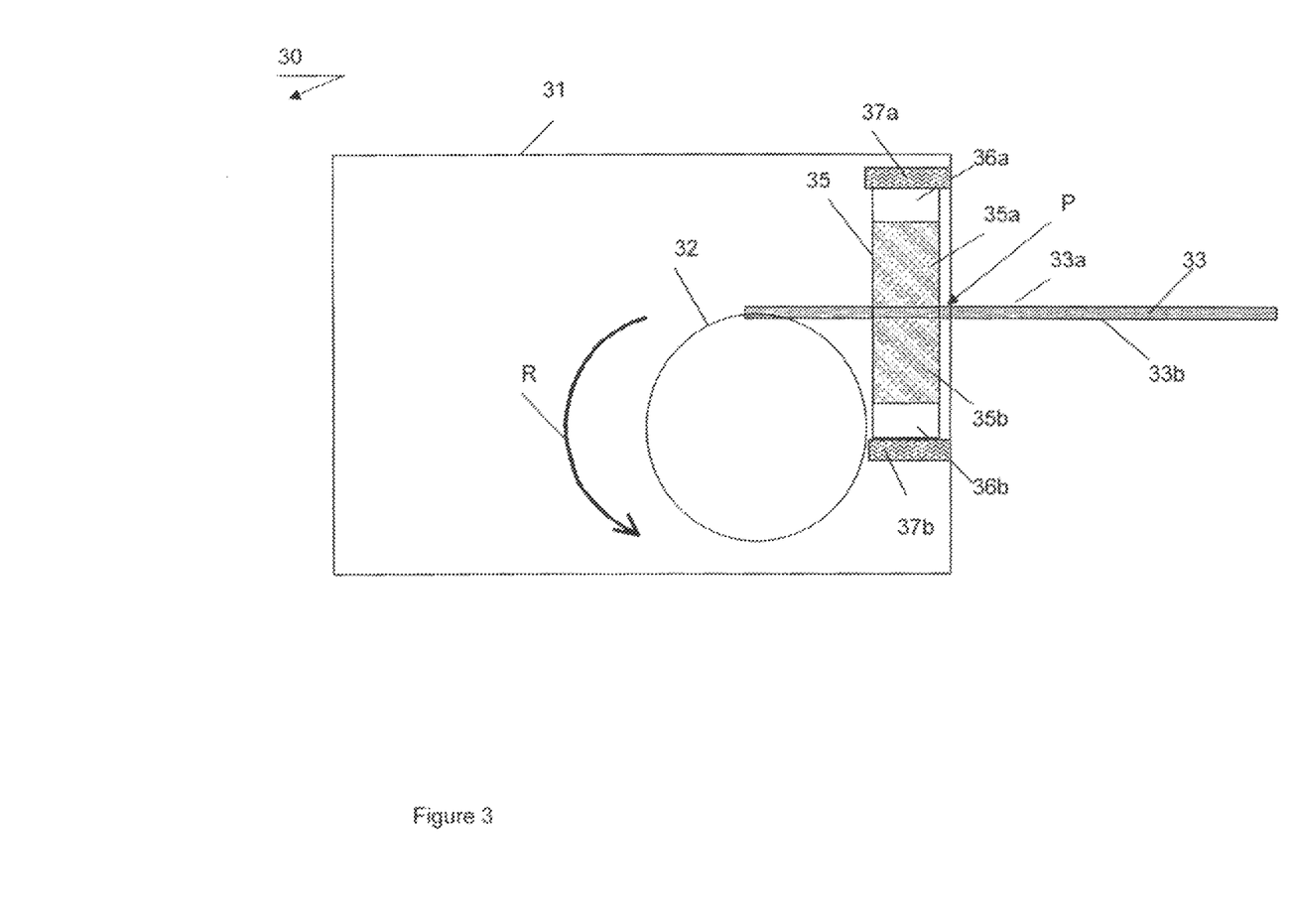
FIG. 3 schematically depicts an embodiment of the cleaning unit according to the invention.

FIG. 3 schematically depicts an embodiment of the cleaning unit according to the invention. The electronic device 30 comprises a housing 31, a rollable display 33 comprising a front surface 33a and a back surface 33b, said rollable display being conceived to be wound about a roller 32, which is rotatable in a direction R during retracting of the display 33. In order to remove contamination present on the surface of the display, the electronic device 30 is provided with the cleaning unit 35, integrated with the housing 31 and preferably positioned inside the housing 31 near the port P through which the display 33 propagates. The cleaning unit 35 comprises a cloth 35a located at a surface of the cleaning unit conceived to contact at least the front surface 33a of the display. Preferably, the cleaning unit 35 also comprises a second cloth 35b arranged to contact the back surface 33b of the display for providing local support to the display 33 and/or to clean the back surface 33b. Preferably, the cloth 35a, 35b is supported by an elastic material 36a, 36b, respectively. More preferably, the cloth 35a, 35b is arranged on a first magnetic material 37a positioned above the display and arranged to interact with a second magnetic material 37b arranged below the display by an attractive force. It is noted that the second magnetic material can be arranged with or without a further cloth 35b conceived to contact a back surface of the display. In an alternative embodiment of the electronic device 30 according to the invention a surface of the cleaning unit conceived to contact at least the front surface 33a of the display comprises a brush. The brush is arranged either to contact the front surface of the flexible device, or the front surface and the back surface of the flexible display.

Figure 4:
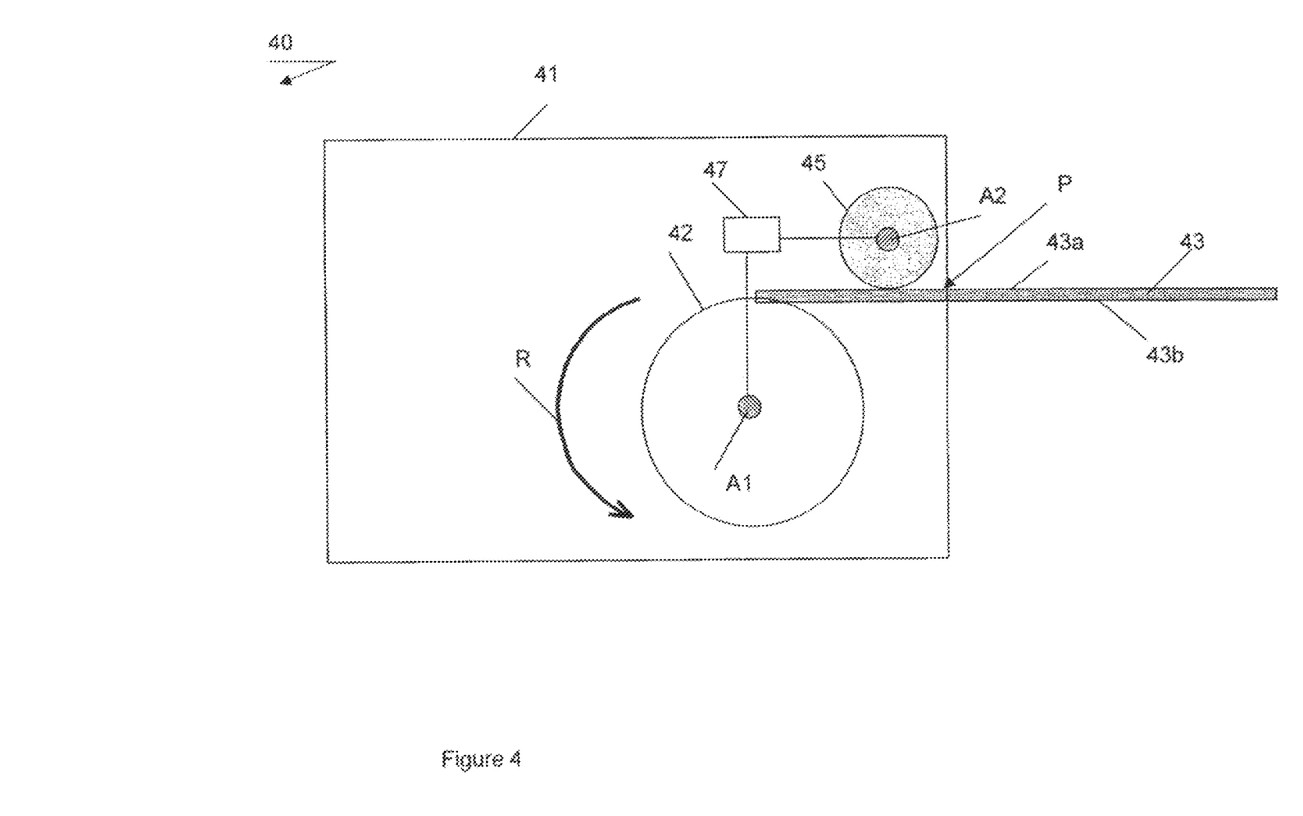
FIG. 4 schematically depicts a further embodiment of the cleaning unit according to the invention.

FIG. 4 schematically depicts a further embodiment of the cleaning unit according to the invention. The electronic device 40 comprises a housing 41 and a flexible display 43 having the front surface 43a and a back surface 43b, said flexible display 43 being conceived to be wound about a roller 42 when not in use. The display 43 enters the housing 41 via a port P. The electronic device according to the invention comprises a cleaning unit 45 provided with a brush which is arranged to rotate about an axis A2, said axis being substantially parallel to a plane 43a in which the display is extended in an area P near the cleaning unit. Preferably, the brush 45 is drivable by the roller 42. More preferably, the angular speed of the brush can be matched to the angular speed of the roller. For example, by coupling the axis A2 of the brush to the axis A1 of the roller, notably using an intermediate gear 47, the rotating brush will remove particles with increased efficiency. It will be appreciated that the direction of rotation of the brush coincides with the direction of rotation of the roller, or, alternatively, is opposite to the direction of rotation of the roller. It is also possible that the brush is rotatable transverse to a direction of propagation of the rollable display.

It is noted that the roll 45 may be arranged to remove contamination by action of an attractive force. In this exemplary case a cloth is used instead of a brush. The roll 45 may be statically arranged. The contamination present on the front surface of the display will be collected by the material of the roll thereby cleaning the display. Alternatively, the roll may be put into rolling action by the movement of the display. In this case the contamination particles collected by the material of the roll are preferably transported by the roll and can be deposited in a suitable container (not shown) cooperating with the roll.

In an alternative embodiment, the attractive force is produced by an adhesive medium arranged on the cleaning unit, for example a roll 45. For example a suitable sticky medium may be arranged on the surface of the cleaning unit collecting the contamination. It is noted that the cleaning unit may be arranged to be in contact with the surface of the display or may be arranged to operate in a contactless way. For the latter the spacing between the cleaning unit and the surface of the display is kept as small as a dimension of the contamination particles.

Figure 5:
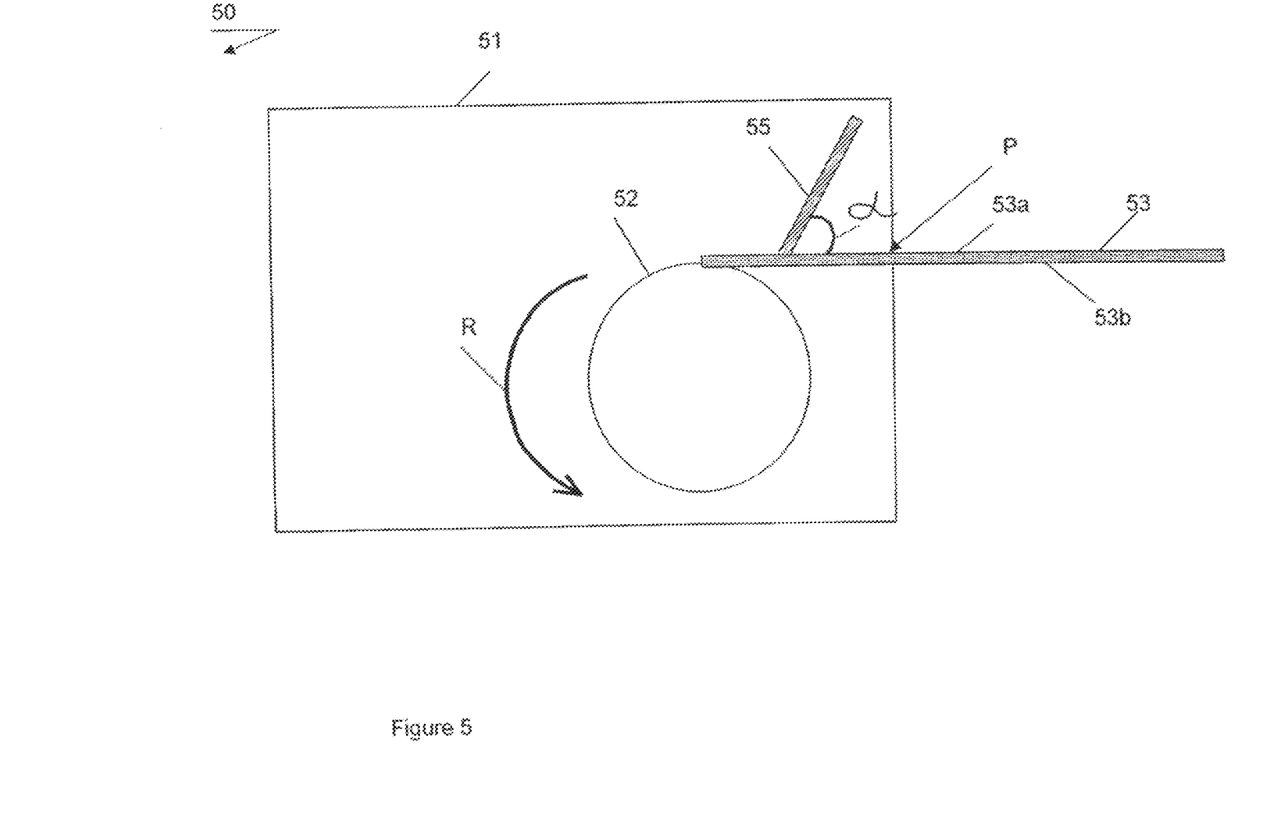
FIG. 5 schematically depicts a further embodiment of the cleaning unit according to the invention.

FIG. 5 schematically depicts a further embodiment of the cleaning unit according to the invention. The electronic device 50 according to a further embodiment of the invention comprises the housing 51 and the rollable display 53 having the front surface 53a and the back surface 53b, said display 53 being arranged to be wound about the roller 52. For this purpose the display 53 enters the housing 51 via the port P. The electronic device 51 further comprises a cleaning unit arranged for cleaning at least the front surface 53a of the display 53 from contamination. The cleaning unit comprises a protruded member conceived to contact at least the front surface of the display. Preferably, a miniature knife or the like is used. More preferably, the protruded member is arranged obliquely with an angle α (alpha) with respect to a plane in which the display extends in an area near the cleaning unit. It is noted that the angle α (alpha) may be either smaller than 90 degrees, or greater than 90 degrees. Due to the oblique arrangement of the protruded member the surface of the display is effectively handled without introducing indentation damage to the display surface. Preferably the cleaning unit set forth with reference to FIGS. 3-5 is arranged to be alternated between a first position of contacting the surface of the display and a second position distant from the surface of the display. Due to this feature the display is cleaned on demand, increasing durability of the display because external mechanical force is not continuously applied to the display.

Figure 6:
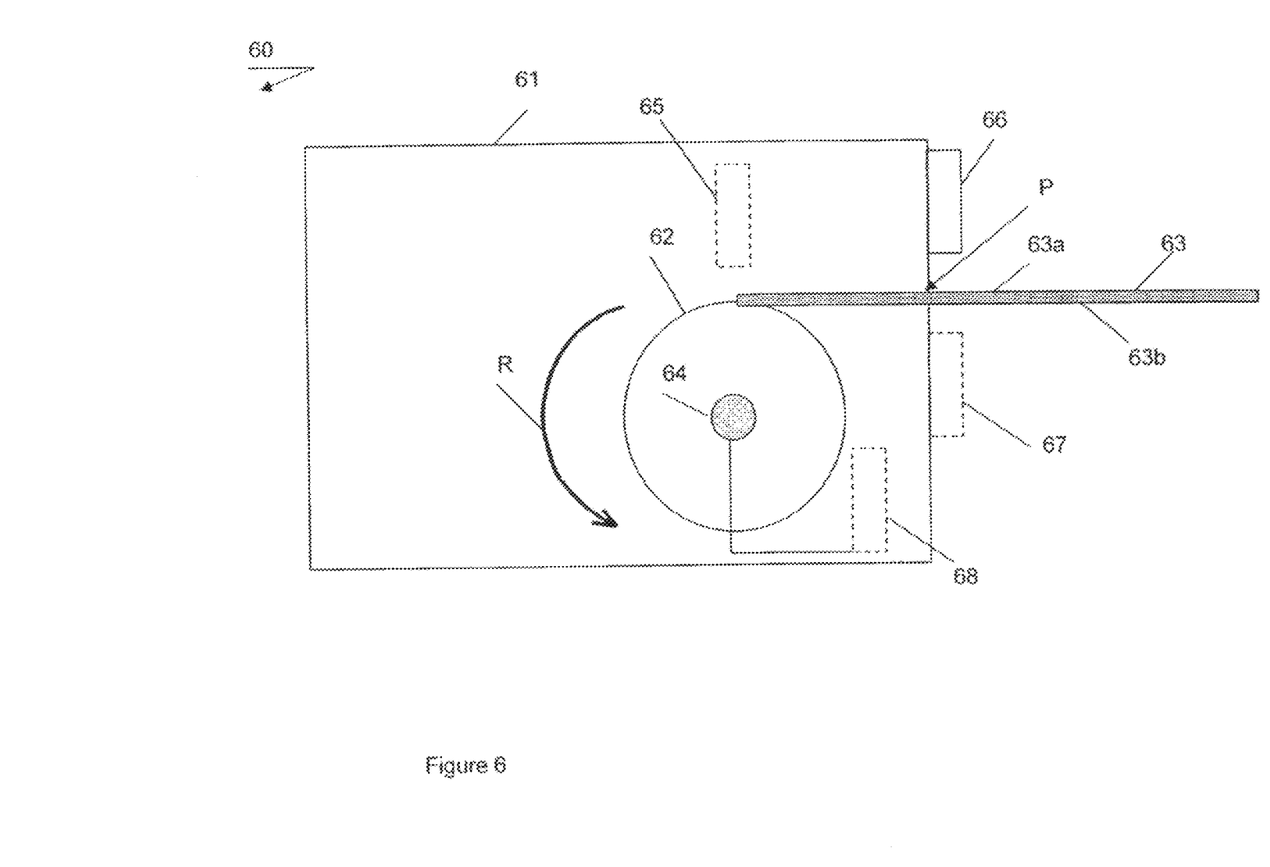
FIG. 6 schematically depicts a further embodiment of the cleaning unit according to the invention.

FIG. 6 schematically depicts a further embodiment of the cleaning unit according to the invention. The electronic device 60 comprises a housing 61 and a rollable display 63 with a front surface 63a and a back surface 63b, wherein the display 63 is arranged to be wound about the roller 62 which is rotatable about the axis 64 in a direction R for retracting the display 63. The electronic device 61 further comprises the cleaning unit arranged to remove contamination from at least the front surface 63a of the display 63. In this particular embodiment the cleaning unit comprises a vibrator for causing the display to vibrate thereby removing the contamination. The vibrator 66 may be arranged at an outer surface of the housing 61 above the display for inducing minor shaking of the display 63 before it propagates through the port P for storage. The vibrator 67 may alternatively be arranged below the display for causing the display to shake before it propagates through the port P. Alternatively, the cleaning unit 68 is arranged inside the housing 61 causing the roller to shake thereby removing particle contamination from a portion of the display 63 which is positioned in between the roller 62 and the port P. In a still alternative embodiment, the vibrator may 65 is positioned inside the housing 61 to cause shaking of an area of the display 63 in a region between the roller 62 and the port P. The latter two embodiments are advantageous because a smaller area of the display is displaced which leads to a more efficient removal of particles by shaking. Preferably the vibrator comprises a generator of acoustic or ultrasonic waves, which are per se known in the art.

Figure 7:
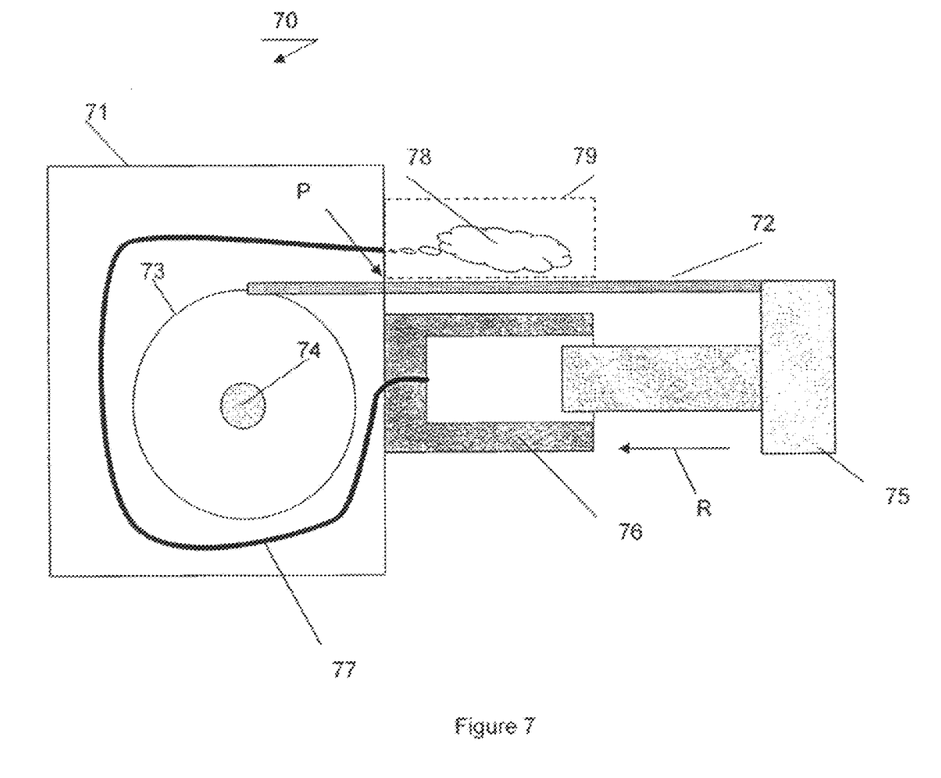
FIG. 7 schematically depicts a further embodiment of the cleaning unit according to the invention.

FIG. 7 schematically depicts a further embodiment of the cleaning unit according to the invention. The electronic device 70 comprises a suitable housing 71 wherein a flexible display 72 is conceived to be stored, for example by being rolled up a roller 73. The roller 73 is rotatable around an axis 74. The flexible display is moveable between a retracted position (being at least partially wound around the roller 73) and an extended position by means of a suitable handle 75. In accordance with the present invention the handle 75 is arranged to cooperate with a reservoir 76 comprising suitable gas, for example, air. By displacing the handle 75 in the direction R, the gas present in the reservoir 76 is compressed and is inserted into the tube 77, whereby the handle 75 operates in a similar way to a pump. The tube 77 is arranged to have an exit near the port P through which the flexible display 72 enters the housing 71 so that an area 79 near the port P is covered by the gaseous flow emanating from the tube 77. A gas flow 78 ejected from the tube 77 in the area 79 has therefore a function of a cleaning unit as particles present on the surface of the display 72 are removed by the action of the gas flow 78. It is noted that electrical principles of activating the gas container 76 are contemplated as well.

It will be appreciated that although specific embodiments of the electronic device according to the invention are discussed separately for clarity purposes, interchangeability of compatible features discussed with reference to isolated figures is envisaged. While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

The invention claimed is:

1. An electronic device comprising:
a housing;
a retractable display movable between an at least partially extended state and a retracted state; and
a cleaning unit integrated in the electronic device and being arranged for removing contamination from at least a front surface of the retractable display, the cleaning unit comprising a first material disposed above the retractable display facing the front surface thereof and a second material disposed below the retractable display facing a back surface thereof, the first material comprising a first magnetic material and a first cleaning material arranged such that the first cleaning material is sandwiched between the first magnetic material and the front surface of the retractable display and arranged to contact the front surface of the retractable display, and the second material comprising a second magnetic material;
wherein the first magnetic material is arranged to interact with the second magnetic material by an attractive magnetic force, and wherein the cleaning unit is fixed at a location in the housing and arranged such that the retractable display moves between the first material and the second material when moved between the at least partially extended state and the retracted state.

2. The electronic device according to claim 1, wherein the first material is arranged for removing the contamination by contacting at least the front surface of the retractable display.

3. The electronic device according to claim 1, wherein the first cleaning material comprises a cloth.

4. The electronic device according to claim 1, wherein the first cleaning material is bound to the first magnetic material by an elastic material.

5. The electronic device according to claim 1, wherein the second material further comprises a second cleaning material sandwiched between the second magnetic material and the back surface of the retractable display and arranged to contact the back surface thereof.

6. The electronic device according to claim 1, wherein the first cleaning material comprises a brush.

7. The electronic device according to claim 5, wherein the second cleaning material comprises a cloth.

8. The electronic device according to claim 5, wherein the second cleaning material comprises a brush.

9. The electronic device according to claim 7, wherein the cloth is bound to the second magnetic material by an elastic material.

\* \* \* \* \*